United States Patent [19]
Brauer et al.

[11] Patent Number: 5,735,671
[45] Date of Patent: Apr. 7, 1998

[54] SHIELDED TURBINE ROTOR

[75] Inventors: John C. Brauer, Lawrenceburg, Ind.; David A. Di Salle, Hamilton; Edward P. Brill, West Chester, both of Ohio; Robert J. Albers, Park Hills, Ky.; Dean T. Lenahan, Cincinnati, Ohio

[73] Assignee: General Electric Company, Cincinnati, Ohio

[21] Appl. No.: 759,093

[22] Filed: Nov. 29, 1996

[51] Int. Cl.$^6$ ........................................... F01D 5/08
[52] U.S. Cl. ............................... 416/95; 415/177
[58] Field of Search ........................ 415/177, 178, 415/180; 416/95

[56] References Cited

U.S. PATENT DOCUMENTS

| | | | |
|---|---|---|---|
| 3,897,171 | 7/1975 | Stahl | 416/244 |
| 4,277,222 | 7/1981 | Barbeau | 415/177 |
| 4,279,575 | 7/1981 | Avery | 416/244 A |
| 4,762,462 | 8/1988 | Lardellier | 415/177 |
| 5,030,060 | 7/1991 | Liang | 416/95 |
| 5,127,795 | 7/1992 | Plemmons et al. | 415/177 |
| 5,320,909 | 6/1994 | Scharman et al. | 428/472 |

FOREIGN PATENT DOCUMENTS 2049068  12/1980  United Kingdom.

*Primary Examiner*—John T. Kwon
*Attorney, Agent, or Firm*—Andrew C. Hess; Patrick R. Scanlon

[57] ABSTRACT

A turbine rotor includes a rotor disk having a plurality of dovetail slots defining therebetween respective disk posts. Each post has a top land and a plurality of tangs spaced radially therebelow inside adjacent ones of the slots. A plurality of turbine blades each having a dovetail are mounted in respective ones of the dovetail slots for radially retaining the blades. A platform is joined integrally with the dovetail and extends circumferentially to adjoin adjacent ones of the platforms to define a radially inner flowpath. An airfoil extends integrally from the platform for extracting energy from combustion gases flowable thereover. A thermal barrier coating is fixedly bonded to each of the disk post top lands for providing thermal insulation between the platforms and the disk posts for reducing disk post temperature.

10 Claims, 2 Drawing Sheets

SHIELDED TURBINE ROTOR

BACKGROUND OF THE INVENTION

The present invention relates generally to gas turbine engines, and, more specifically, to turbine rotors therein.

A gas turbine engine includes a compressor for pressurizing air which is channeled to a combustor wherein it is mixed with fuel and ignited for generating hot combustion gases which flow downstream through one or more turbines which extract energy for powering the compressor and providing useful work. The turbine stages include stationary turbine nozzles and rotating turbine rotors through which the hot combustion gases flow. Vanes in the nozzles, and blades in the rotor are usually hollow for channeling therethrough a portion of air bled from the compressor for suitably cooling the turbine components from the substantial elevated temperature of the combustion gases.

A typical turbine rotor includes a rotor disk having axial entry dovetail slots around the perimeter thereof which define corresponding disk posts. The dovetail slots receive corresponding axial dovetails of the turbine blades which are radially retained by the disk posts. Each of the blades also includes an integral platform between an airfoil portion and the dovetail, with the platforms collectively defining a radially inner flowpath boundary for the combustion gases which flow axially between the adjacent blade airfoils. An annular shroud surrounds the airfoils and provides a radially outer flowpath boundary for the combustion gases. The individual airfoils, and the radially outer surfaces of the integral platforms therefore are directly exposed to the hot combustion gases and heated thereby.

In order to ensure an effective useful life of the turbine blades during operation, they are typically made from conventional cobalt or nickel based superalloys having suitable strength at elevated temperature. The blade material may be further protected from the adverse affects of the hot combustion gases by coating the airfoil portion with a conventional gas impervious environmental coating to protect the airfoil surface against undesirable oxidation during operation. The airfoils may also be additionally coated with a gas permeable thermal barrier coating (TBC) for providing heat insulation against the elevated temperature of the combustion gases. In this way, the airfoil which is directly exposed to the hot combustion gases may be further protected therefrom by using the TBC and environmental coating if desired.

However, the turbine airfoils and integral platforms still operate at a substantially elevated temperature typically requiring internal cooling of the airfoils themselves, as well as suitable heat protection of the adjacent components. For example, the turbine blades are mounted to the rotor disk with the integral blade platforms providing a direct thermal shield above the rotor disk preventing contact therewith by the combustion gases. The cooling air channeled to the turbine airfoils is provided thereto through the dovetail slots in the turbine rotor, with the cooling air also being effective for cooling the turbine rotor in the region of the dovetail slots. In the disk post cavities found between the disk posts and the underside of the blade platforms, additional bleed air referred to as purge air is channeled therethrough.

Nevertheless, the rotor disk itself is heated by conduction from the heat carried radially inwardly through the individual turbine blades. It is also heated by convection from the relatively high temperature purge air channeled in the disk post cavities. And it is further heated by radiation from the underside of the blade platforms. Since the turbine disk is a rotating component which carries the substantial centrifugal loads generated by the turbine blades during operation, it must have suitable strength at elevated temperature. Typical superalloys are used for the rotor disk for their enhanced strength at elevated temperatures. Nevertheless, the disk posts and individual tangs which define the dovetail slots are subject to creep deformation over time at elevated temperature which reduces the useful life of the rotor disk.

It is therefore desirable to further improve the strength of turbine rotor disks without requiring more costly higher temperature capable superalloys or significant redesign of the components. Conventional turbine blades having integral adjoining platform have evolved into cost effective and efficient structural and aerodynamic configurations having minimum sealing requirements and components therefor. It is therefore desirable to further improve the turbine rotor for high temperature operation without significantly affecting conventional designs, or adversely affecting turbine strength including fatigue and creep strengths.

SUMMARY OF THE INVENTION

A turbine rotor includes a rotor disk having a plurality of dovetail slots defining therebetween respective disk posts. Each post has a top land and a plurality of tangs spaced radially therebelow inside adjacent ones of the slots. A plurality of turbine blades each having a dovetail are mounted in respective ones of the dovetail slots for radially retaining the blades. A platform is joined integrally with the dovetail and extends circumferentially to adjoin adjacent ones of the platforms to define a radially inner flowpath. An airfoil extends integrally from the platform for extracting energy from combustion gases flowable thereover. A thermal barrier coating is fixedly bonded to each of the disk post top lands for providing thermal insulation between the platforms and the disk posts for reducing disk post temperature.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
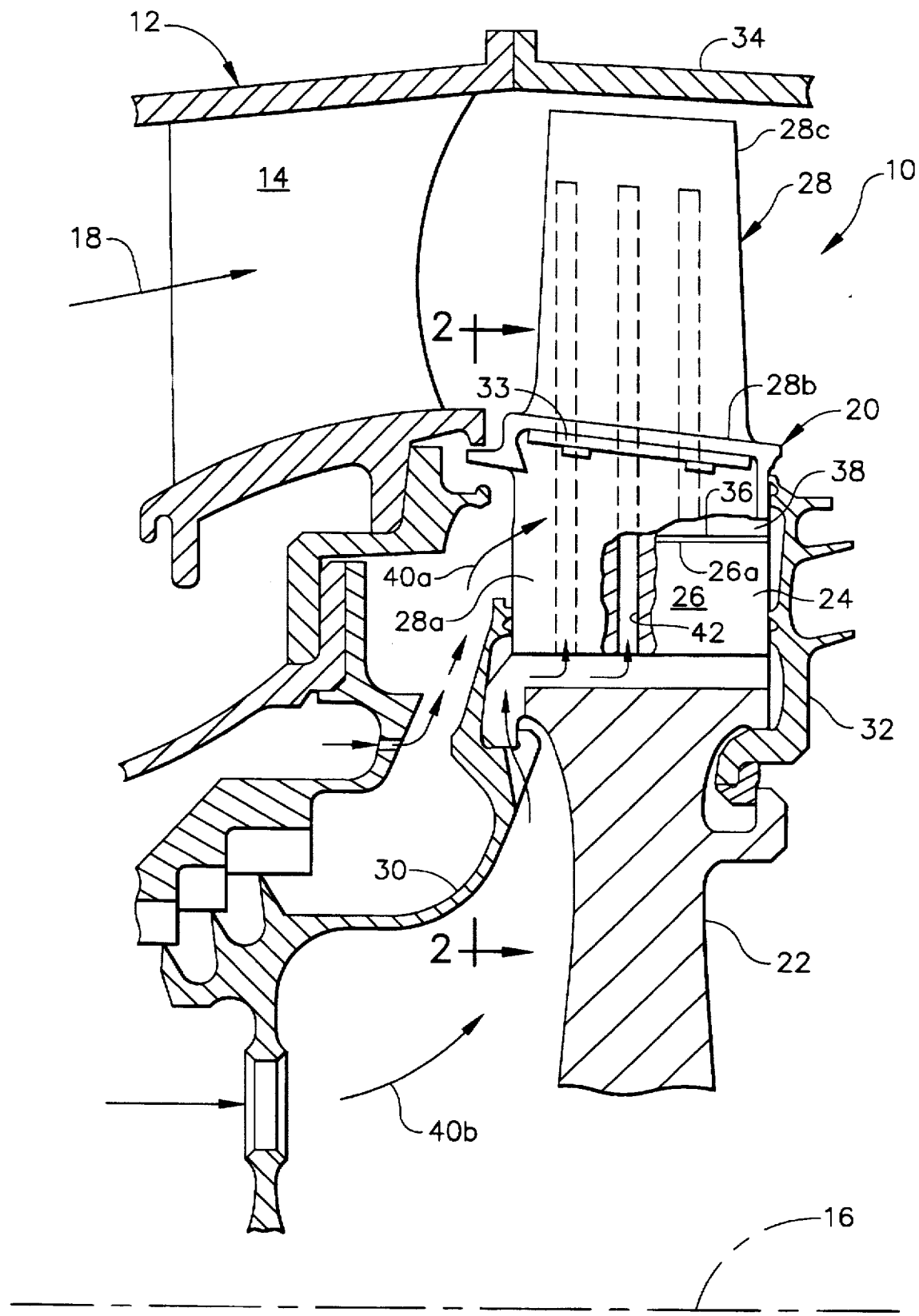
FIG. 1 is a partly sectional, axial elevation view of an exemplary high pressure turbine rotor in accordance with an exemplary embodiment of the present invention including turbine blades dovetail mounted to a rotor disk.

FIG. 1 illustrates an exemplary embodiment of a high pressure turbine 10 for an aircraft gas turbine engine. The turbine includes an annular turbine nozzle 12 having a plurality of conventional vanes 14 circumferentially spaced apart from each other about a longitudinal or axial centerline axis 16. The nozzle 12 is disposed immediately downstream of a conventional combustor (not shown) and receives hot combustion gases 18 therefrom.

Disposed immediately downstream of the turbine nozzle 12 is a turbine rotor 20 in accordance with an exemplary embodiment of the present invention. The rotor 20 includes a rotor disk 22 disposed coaxially with the nozzle 12 about the centerline axis 16. The disk 22 has a plurality of circumferentially spaced, axially extending dovetail slots 24, which are additionally shown in end view in FIG. 2.

Adjacent ones of the dovetail slots 24 define therebetween respective, radially extending disk posts 26. Each post 26 has a radially outer top land 26a which extends circumferentially from slot to slot and fully axially from the forward to aft ends of the disk 22. Each disk post 26 includes a plurality of oppositely extending supporting tangs 26b spaced radially below the top land 26a inside adjacent ones of the dovetail slots 24.

The rotor 20 also includes a plurality of turbine blades 28 each having an axial entry dovetail 28a mounted in a respective one of the dovetail slots 24 for radially retaining the blade 28. As shown in FIG. 1, an annular forward blade retainer 30 is suitably fixedly mounted to the forward face of the disk 22 and dovetails 28a in a conventional bayonet locking arrangement, and a conventional annular aft blade retainer 32 is joined between the aft faces of the disk 22 and the dovetails 28a for axially retaining the dovetails in the disk 22.

Figure 2:
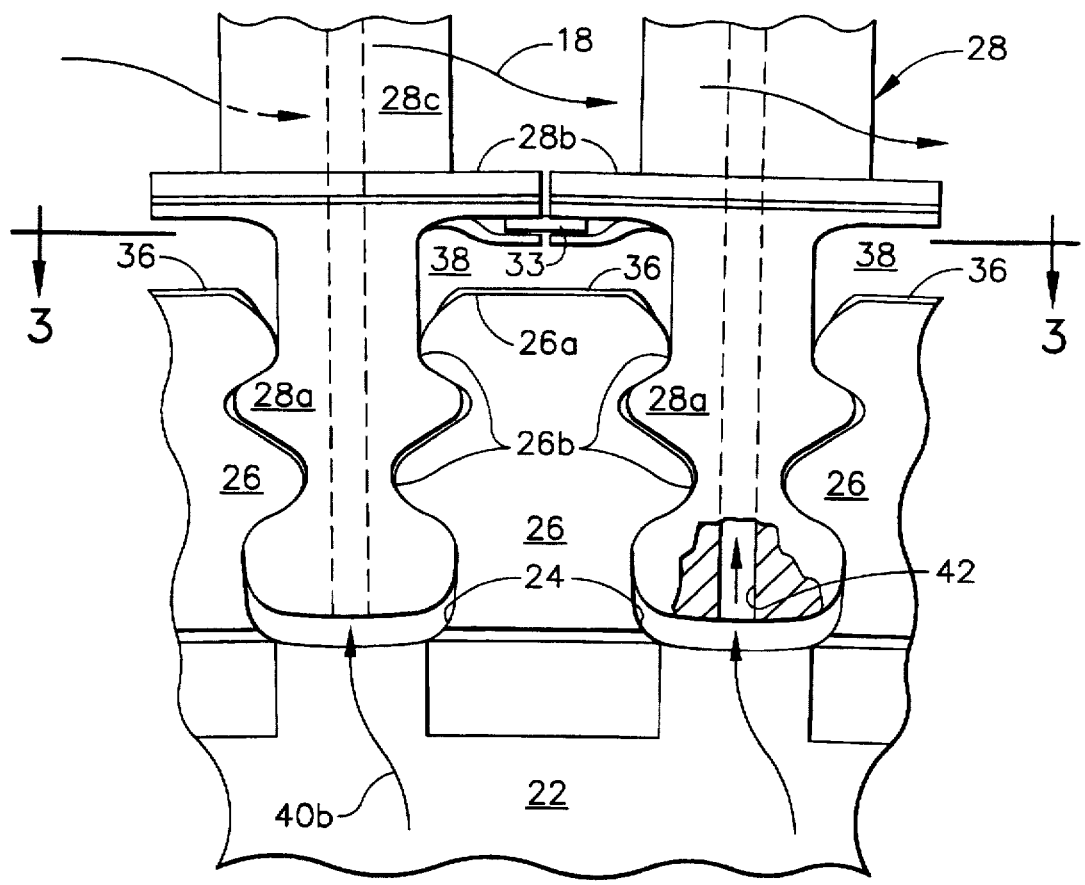
FIG. 2 is an aft facing, radial view of adjacent ones of the turbine blades illustrated in FIG. 1 mounted to the rotor disk and taken generally along line 2—2.

Each of the blades 28 further includes a platform 28b disposed integrally with the dovetail 28a and extending circumferentially from opposite sides thereof to adjoin adjacent ones of the platforms 28b and provide a relatively small gap therebetween as illustrated in FIG. 2. The circumferentially adjoining platforms 28b collectively define a radially inner flowpath or boundary over which the combustion gases 18 flow during operation. The blade 28 also includes an airfoil 28c which is disposed integrally with the platform 28b for extracting energy from the combustion gases 18 flowable thereover during operation.

Each of the blades 28 is preferably a one-piece assembly of the dovetail 28a, platform 28b, and airfoil 28c, and adjacent ones of the platforms 28b adjoin each other above the top lands 26a for providing a relatively small gap therebetween. A conventional axial spline damper seal 33 bridges the adjacent platforms 28b at the platform gap to seal leakage and provide friction damping.

As shown in FIG. 1, a conventional annular shroud 34 is disposed radially outwardly of the airfoils 28c and joins the turbine nozzle 12 for defining a radially outer flowpath or boundary for the combustion gases 18.

The turbine disk 22 and turbine blades 28 may take any conventional form, with suitable configurations of the dovetails 28a and the dovetail supporting disk posts 26. During operation, the rotating blades 28 develop centrifugal force which is carried by the dovetails 28a into the adjacent disk posts 26 and in turn into the remainder of the annular rotor disk 22. The rotor disk 22, and in particular the disk posts 26 are therefore subject to substantial centrifugal loads and corresponding centrifugal stress during operation. The individual tangs 26b of the disk posts 26 engage complementary tangs of the dovetails 28a for carrying the centrifugal loads into the disk post 26 and are therefore also highly stressed during operation.

Since the rotor disk 22 operates at an elevated temperature due to the heating effects of the combustion gases 18, it must be formed of a suitable material providing acceptable strength at elevated temperature for enjoying a useful life. For example, the disk 22 may be formed of conventional cobalt or nickel based superalloys having high temperature strength capability. In an exemplary embodiment, the perimeter of the disk 22 including the disk post 26 can achieve steady state temperatures greater than about 650° C., and therefore, this material must have suitable high strength capability including creep strength at such elevated temperature. Suitable creep strength is required for preventing excessive creep in the form of overall post growth and localized tang bending which would limit the useful life of the disk 22.

In accordance with one embodiment of the present invention as illustrated in FIGS. 1 and 2, a thermal barrier coating (TBC) 36, or thermal insulator, is suitably fixedly bonded to each of the disk post top lands 26a for providing a thermal shield or insulation between the underside of the platforms 28b and the top of the disk posts 26. In a preferred embodiment, both the disk 22 and blades 28 are conventional nickel or cobalt based superalloy metals, with the coating 36 being suitably bonded to the outer surface of the top lands 26a using any conventional process including plasma spraying. An exemplary coating 36 is yttria stabilized zirconia. It may be plasma deposited in a relatively thin coating of a suitable thickness up to about 25 mils, for example. And it provides a thermal conductivity of about 1 BTU/Hr-ft-° F. for example. The thermal barrier coating is air or gas permeable, or porous, for providing effective thermal insulation. This is in contrast to conventional environmental coatings which are air and gas impervious for preventing oxidation of the parent or base material to which they are adhered.

Since any type of coating applied to a highly stressed metal component such as the turbine disk 22 can crack during operation and provide a crack initiation site for the underlying base material, it is preferably desirable to use such coatings only in relatively low tensile stress areas or in compressive stress areas. Thermal barrier coatings are typically brittle and have substantially less ductility than that of the base metal of the rotor disk 22. Accordingly, if they are applied in areas subject to thermal shock or high tensile stress, they may crack and thereby undesirably degrade the fatigue strength capability of the parent material.

Figure 3:
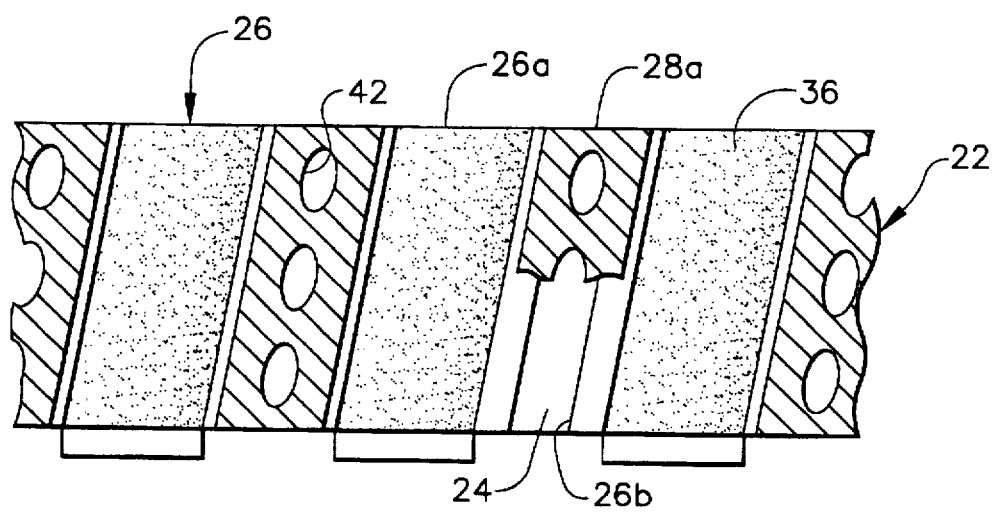
FIG. 3 is a partly sectional, top view through a portion of the blades illustrated in FIG. 2 above the rotor disk and taken generally along line 3—3.

In accordance with the preferred embodiment of the present invention, the coating 36 is applied or disposed solely over the top lands 26a atop the disk posts 26 of the rotor disk 22 which experiences relatively low stress during operation for thereby reducing degradation of fatigue life of the turbine rotor 22 itself. As shown in FIGS. 2 and 3, the coating 36 preferably extends entirely over the top land 26a circumferentially from slot to slot, and axially between the forward and aft ends of the disk 22. Since the blade shanks above the dovetails 28a occupy the dovetail slot 24 between the adjacent disk posts 26, the entire exposed outer surface of the rotor 22 facing radially upwardly is preferably covered by the coating 36.

Although the blade platforms 28b as illustrated in FIG. 2 provide a direct shield between the combustion gases 18 and the rotor disk 22, the platforms 28b themselves are heated to an elevated temperature and radiate heat radially inwardly toward the disk 22. The thermal barrier coating 36 disposed atop the disk posts 26 thereby provides an effective insulation against radiation from the platforms 28b for decreasing the input heat to the disk posts 26.

In the preferred embodiment illustrated in FIG. 2, the platforms 28b are spaced radially above the top lands 26a to define therebetween respective disk post cavities 38. And, as shown in FIG. 1, conventional means are provided for channeling purge air 40a through the cavities 38 during operation. The purge air 40a may be provided as a portion of air bled from the compressor (not shown) of the engine and suitably channeled along the outer surface of the forward blade retainer 30. The purge air 40a axially enters the forward end of the blades 28 below the platforms 28b for flow through the disk post cavities 38. Since the forward blade retainer 30 rotates during operation, it heats the compressor bleed air and in turn the purge air 40a which flows through the disk post cavities 38. The purge air therefore undesirably provides convection heat transfer towards the disk post 26 which is substantially reduced by the interposed coating 36.

Since the turbine blades 28 are one-piece metal structures, heat conduction radially inwardly therethrough carries heat into the turbine disk 22 through the disk posts 26. Accordingly, suitable means are also provided for channeling cooling air 40b through the dovetail slots 24 and in turn inside the blades 28 for cooling in particular the individual blades 28, and for providing a heat sink for cooling the disk posts 26 radially inwardly of the coatings 36 for ensuring effective performance of the coatings 36 during steady state operation as well as during transient operation.

More specifically, and as shown in FIGS. 1 and 2, each of the blades 28 includes a cooling circuit 42 therein which may take any conventional form. The cooling circuit 42 includes passages extending from the bottom of the dovetail 28a for providing a cooling air inlet thereto, with the passages extending upwardly through the dovetail 28a, the platforms 28b and through the individual airfoils 28c. The cooling air 40b is suitably bled from the compressor and channeled inside the annular forward blade retainer 30 for flow radially upwardly between the retainer and the forward side of the rotor disk 22. The cooling air 40b is suitably channeled between the bayonet mounts and axially enters the forward end of the bottom of the dovetail slots 24. From here it enters the bottom of the individual dovetails 28a for flow radially upwardly into the airfoils 28c for providing effective cooling thereof.

As shown in FIG. 2, the cooling air 40b enters the dovetail slots 24 on both sides of the individual disk posts 26. Accordingly, this cooling air 40b provides an effective heat sink for withdrawing heat from the bottom of the individual disk posts 26. In this way, the coating 36 atop the disk post 26 works in conjunction with the heat sink provided by the cooling air 40b for reducing the temperature of the disk post 26 during operation both during steady state operation as well as during transient operation. The coating 36 limits heat input into the disk post 26, with the cooling air 40b being effective for removing heat from the disk post 26 for ensuring a reduced steady state operating temperature of the disk post 26. By thusly operating the disk posts 26 at a lower temperature than they would otherwise have without the coating 36, the creep strength and therefore creep life of the turbine disk 22 are therefore increased.

The specific and limited use of the coating 36 atop the disk posts 26 provides an effective thermal shield for further protecting the turbine disk 22 from the severe thermal environment of the blade platforms 28b and airfoils 28c heated by the combustion gases 18. A significant reduction in disk post metal temperature during both steady state and transient operation is obtained for improving the creep life of the turbine disk 22.

Alternatively, the turbine 10 may be operated at a higher temperature for improved efficiency without a costly change to more expensive, higher temperature capable disk material. The coating 36 is selectively applied to only the top of the disk posts 26 in a relatively thin coating having correspondingly low weight and low volume, as well as low cost. It works in harmony with conventional turbine designs and does not require additional components or major redesigns. It is applied to the low stress area of the disk posts 26 to ensure that the fatigue life of the turbine disk 22 is not significantly degraded due to the brittle nature of the coating 36.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine rotor comprising:

a rotor disk having a plurality of circumferentially spaced apart, axially extending dovetail slots defining therebetween respective disk posts, with each post having a radially outer top land and a plurality of tangs spaced radially below said top land inside adjacent ones of said slots;

a plurality of turbine blades each having a dovetail mounted in a respective one of said dovetail slots for radially retaining said blade, a platform integral with said dovetail and extending circumferentially to adjoin adjacent ones of said platforms to define a radially inner flowpath, and an airfoil integral with said platform for extracting energy from combustion gases flowable thereover; and a thermal barrier coating fixedly bonded to each of said disk post top lands for providing thermal insulation between said platforms and said disk posts.

2. A rotor according to claim 1 wherein said coating is disposed solely atop said disk posts of said rotor disk for reducing degradation of fatigue life of said turbine disk.

3. A rotor according to claim 2 wherein said coating is air-permeable.

4. A rotor according to claim 2 wherein said platforms are spaced radially above said top lands to define cavities, and means are provided for channeling purge air through said cavities, with said coating being effective for reducing convection heat transfer from said purge air to said disk posts.

5. A rotor according to claim 4 further comprising means for channeling cooling air through said slots and in turn inside said blades for cooling said blades, and providing a heat sink for cooling said disk posts below said coatings.

6. A rotor according to claim 5 wherein:

each of said blades is a one-piece assembly of said dovetail, platform, and airfoil; and adjacent ones of said platforms adjoin each other above said top lands for providing a fluid seal against leakage therebetween.

7. A rotor according to claim 6 wherein said disk and blades are metal, and said coating is bonded to an outer surface of said top land.

8. A rotor according to claim 6 wherein said coating is up to about 25 mils thick.

9. A rotor according to claim 6 wherein said coating extends entirely over said top land circumferentially from slot to slot, and axially between forward and aft ends thereof.

10. A rotor according to claim 6 wherein said coating has a thermal conductivity of about 1 BTU/Hr-ft-° F.

* * * * *